US008588688B2

(12) United States Patent
Reunamäki et al.

(10) Patent No.: US 8,588,688 B2
(45) Date of Patent: Nov. 19, 2013

(54) NON-NETWORKED MESSAGING

(75) Inventors: Jukka Reunamäki, Tampere (FI); Arto Palin, Viiala (FI)

(73) Assignee: Nokia Corporation, Espoo (FI)

(*) Notice: Subject to any disclaimer, the term of this patent is extended or adjusted under 35 U.S.C. 154(b) by 21 days.

(21) Appl. No.: 13/012,240

(22) Filed: Jan. 24, 2011

(65) Prior Publication Data

US 2012/0190302 A1 Jul. 26, 2012

(51) Int. Cl.
H04B 7/00 (2006.01)
(52) U.S. Cl.
USPC .......... 455/41.2; 455/500; 455/502; 455/503; 455/517; 455/518; 455/519; 455/68; 455/69; 709/231; 709/232
(58) Field of Classification Search
USPC ............... 455/418, 445, 456.1, 456.3, 456.4, 455/456.6, 41.2, 500, 502–503, 517, 518, 455/519, 68–70; 709/230–232, 236–237, 709/208–209, 220–222
See application file for complete search history.

(56) References Cited

U.S. PATENT DOCUMENTS

| 6,380,888 | B1 | 4/2002 | Kucik | |
| 6,975,618 | B1 | 12/2005 | Smith et al. | |
| 6,987,975 | B1* | 1/2006 | Irvin et al. | 455/456.1 |
| 7,181,230 | B2 | 2/2007 | Nonoyama et al. | |
| 7,512,685 | B2* | 3/2009 | Lunsford et al. | 709/227 |
| 7,606,578 | B2* | 10/2009 | Irvin et al. | 455/456.1 |
| 7,986,917 | B2* | 7/2011 | Ahlgren et al. | 455/41.2 |
| 8,165,523 | B2* | 4/2012 | Makela et al. | 455/41.2 |
| 2002/0175819 | A1 | 11/2002 | Joo | |
| 2003/0220114 | A1* | 11/2003 | Langensteiner et al. | 455/450 |
| 2004/0142690 | A1* | 7/2004 | Eom et al. | 455/436 |
| 2004/0162059 | A1* | 8/2004 | Hiltunen et al. | 455/412.1 |
| 2005/0156712 | A1* | 7/2005 | Jyrinki | 340/286.01 |
| 2008/0154501 | A1 | 6/2008 | Meyer | |
| 2010/0081376 | A1* | 4/2010 | Emura | 455/41.1 |
| 2010/0250135 | A1* | 9/2010 | Li et al. | 701/300 |
| 2010/0291952 | A1* | 11/2010 | Gosset et al. | 455/466 |

FOREIGN PATENT DOCUMENTS

| EP | 1 416 703 A2 | 5/2004 |
| EP | 1 538 791 A2 | 6/2005 |
| WO | WO9810307 | 3/1998 |
| WO | 02/01814 A2 | 1/2002 |

OTHER PUBLICATIONS

Partial European Search report mailed May 4, 2012 in European Application No. 11195136.4, 5pp.

(Continued)

Primary Examiner — Tuan A Tran
(74) Attorney, Agent, or Firm — Locke Lord LLP

(57) ABSTRACT

A system for facilitating short-range wireless data exchanges between apparatuses that are not linked by a wireless network connection. For example, an apparatus may initially determine if data suitable for transmission without first establishing a formal network connection is pending. For example, in terms of Bluetooth the data may suitable for transmission to another apparatus without having to first negotiate a Bluetooth piconet including both apparatuses. If it determined that data is pending for transmission, the apparatus may scan for apparatus detection packets transmitted from other apparatuses (e.g., enter an inquiry scanning mode). Upon reception of an apparatus detection packet, the apparatus may transmit one or more messages via wireless communication (e.g., execute an extended inquiry response procedure) comprising at least the data.

19 Claims, 8 Drawing Sheets

(56) References Cited

OTHER PUBLICATIONS

Bluetooth Core Specification v. 4.0, Published Jun. 30, 2010; vol. 2, Section 2.5, pp. 81-82; vol. 2, Section 6.5.1.4, pp. 119-121; vol. 3, Section 6.4, pp. 318-319; vol. 3, Section 8, pp. 330-334.

GPS Navstar: "Global Positioning System Standard Positioning Service Signal Specification", 2nd Edition, Jun. 2, 1995, 52 pages.

Extended European Search Report and Opinion for European Application No. EP 11195869—Date of Completion of Search: Jan. 30, 2013, 10 pages.

\* cited by examiner

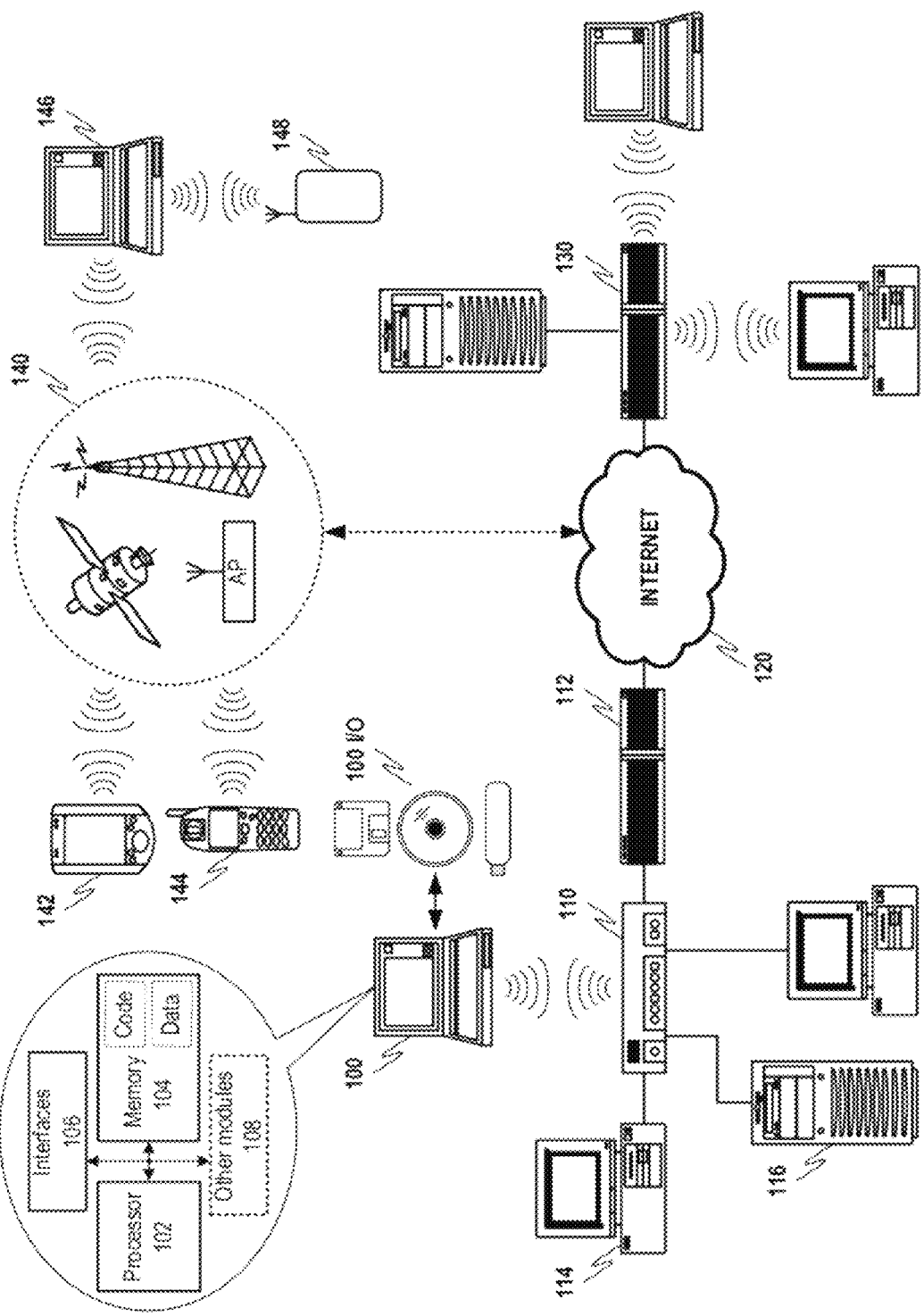

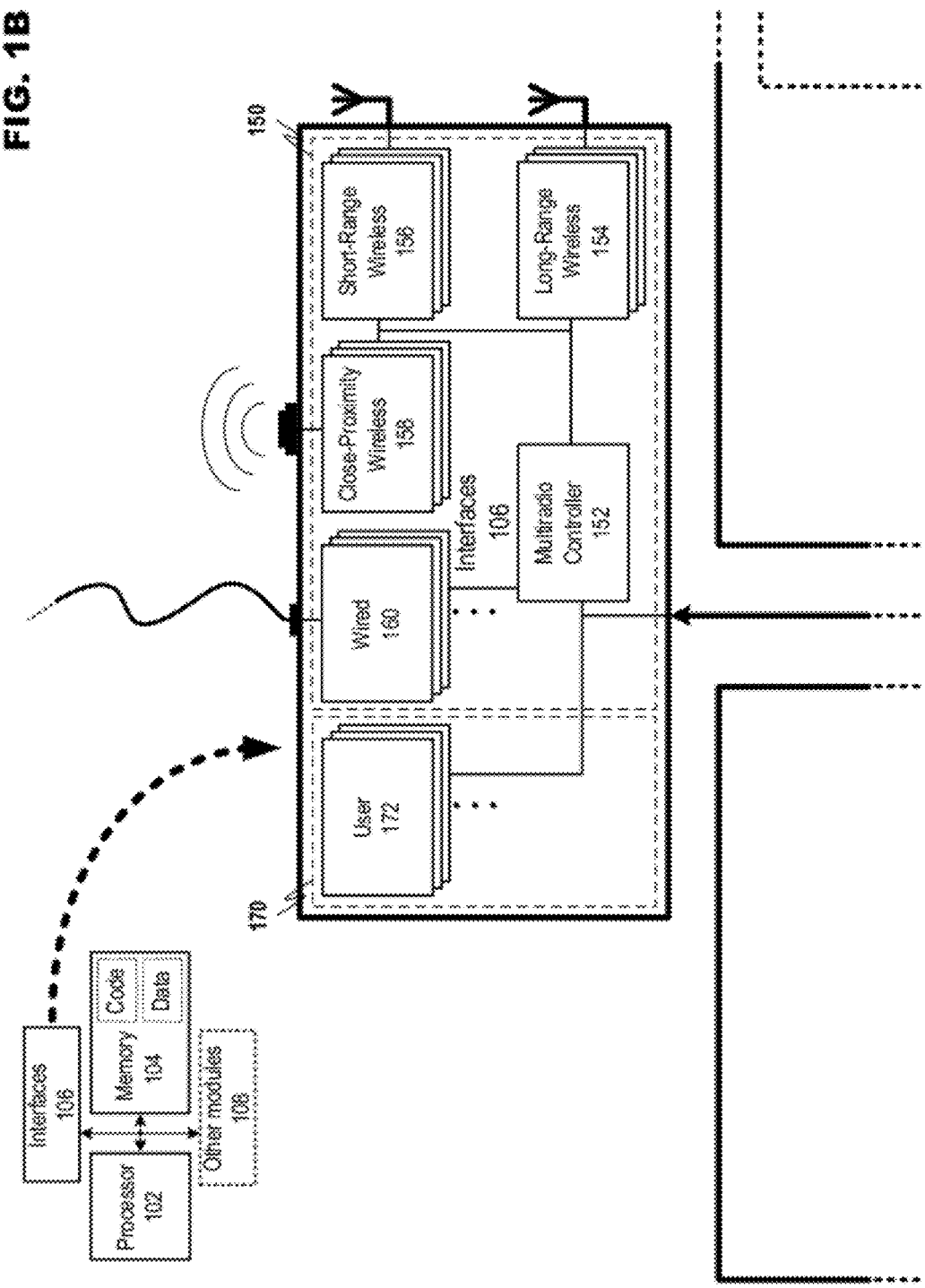

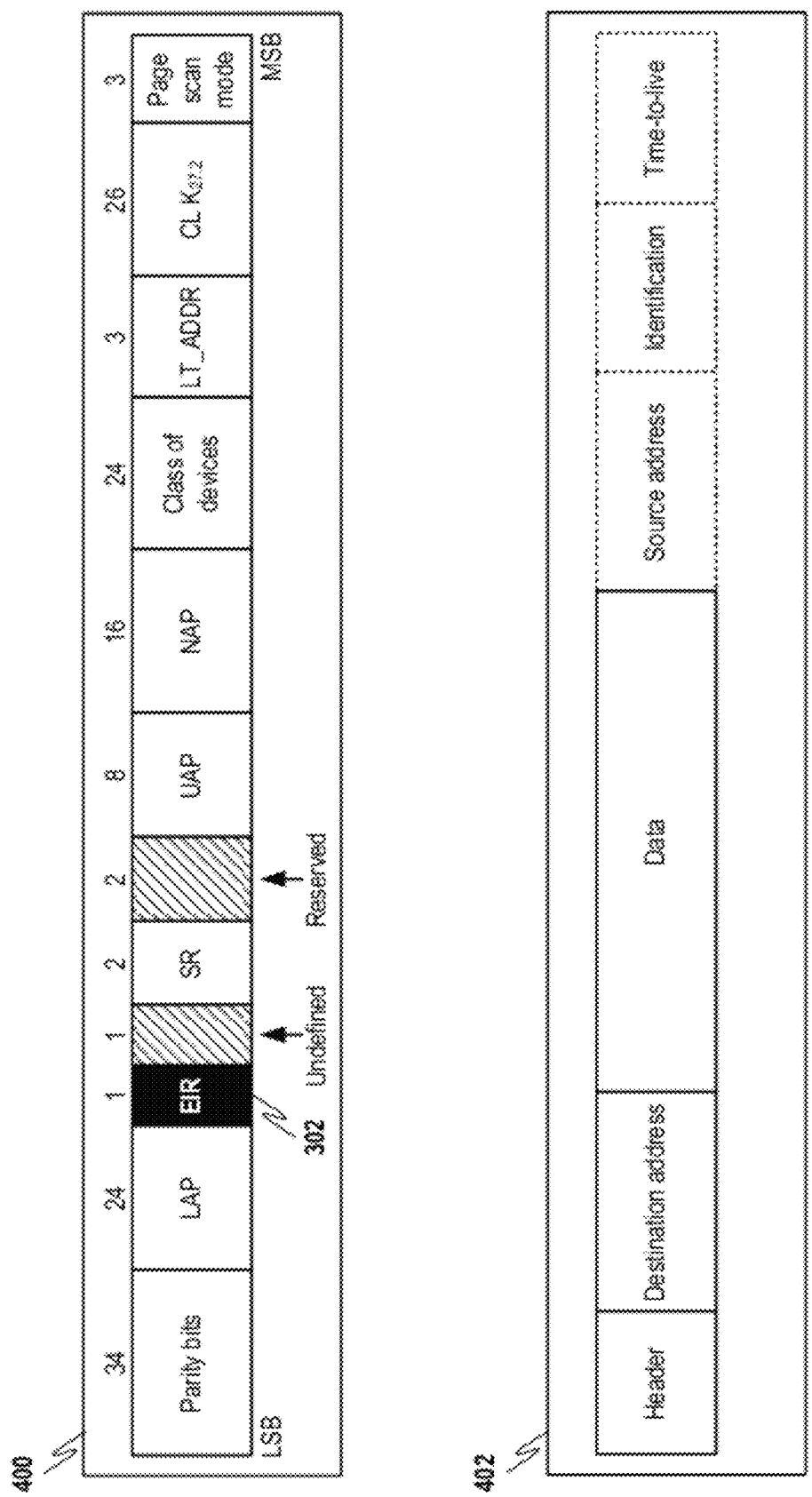

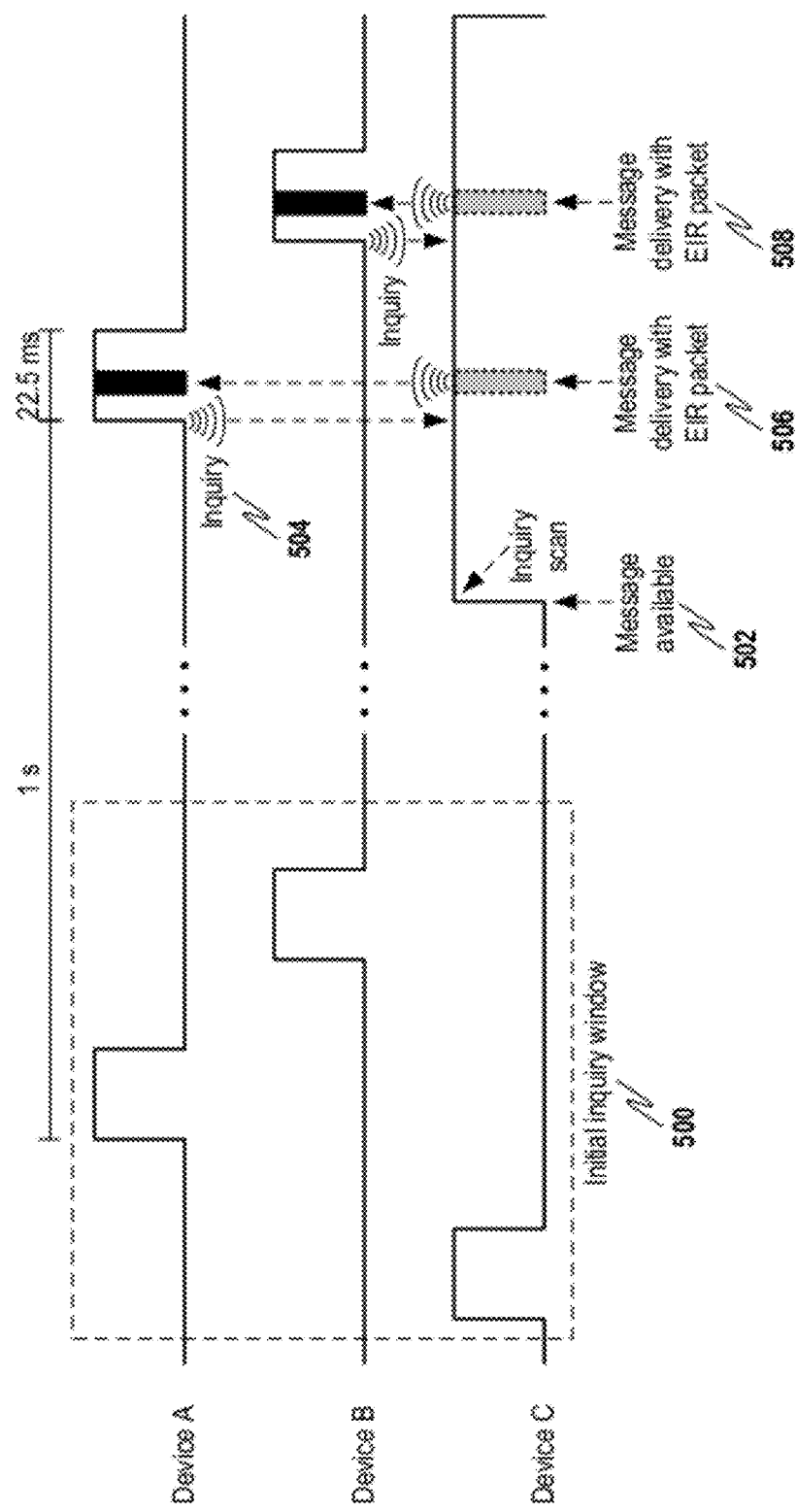

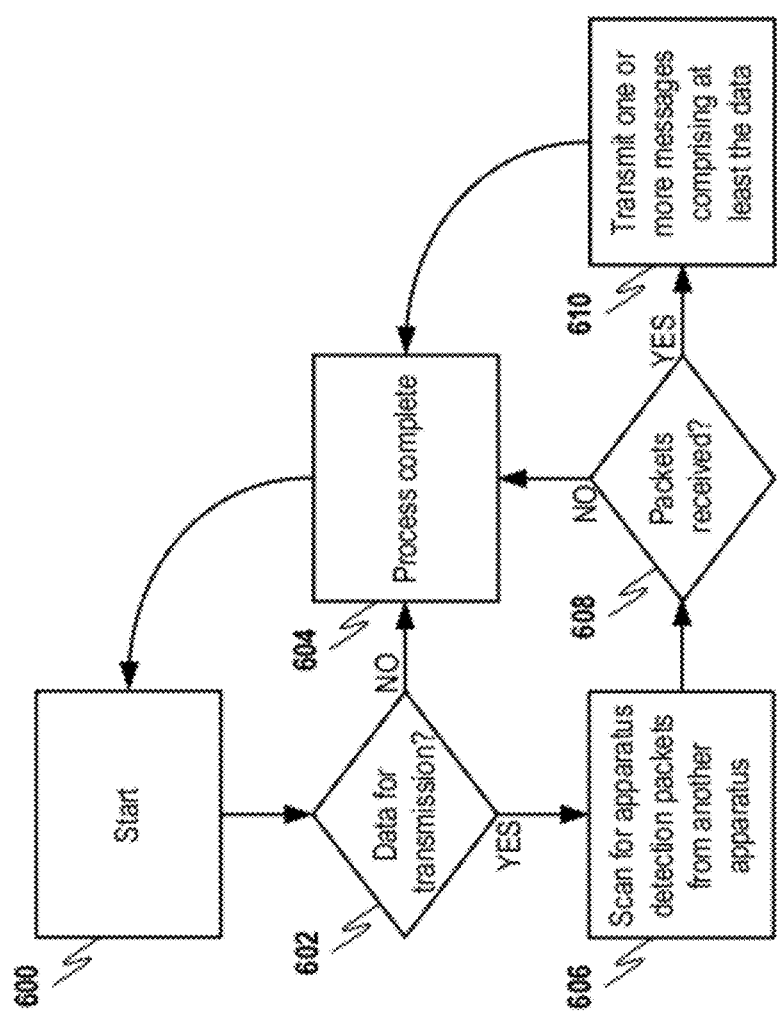

NON-NETWORKED MESSAGING

BACKGROUND

1. Field of Invention

The present invention relates to wireless communication, and in particular, to the facilitation of data exchanges between apparatuses without an underlying network connection.

2. Background

Wireless-enabled apparatuses are not limited to only exchanging voice data, such as in the instance of simple mobile cellular handsets, but may now incorporate various types of communication-related functionality. For example, apparatuses may utilized wireless interaction to exchange emails, messages, multimedia (e.g., audio and video) information, etc. Moreover, some applications may be implemented on wireless-enabled apparatuses that provide services not directly related to the communication of data, but may still rely on underlying wireless links to remote resources in order to provide the services. Positioning-related services (e.g., location mapping, routing, object tracking, position-relevant commercial information, etc.), consumer review databases, public transportation updates, games, etc. are examples of such applications.

Supporting such a large spectrum of desired functionality depends directly on the communication mediums that are supported in a wireless-enabled apparatus. For example, many of the above activities may be supported by long-range (e.g., cellular) wireless networks. While long-range wireless networks may provide adequate data throughput for supporting the information requirements of these applications, there may also be drawbacks to this type of access. Initially, long-range networking may place substantial resource burdens on some apparatuses when simply maintaining a connection to the network. This burden may increase when the apparatus is not in an area that provides strong signal coverage such as within some buildings, when underground (e.g., riding a subway system), etc. As a result, alternative solutions may be desired, such as supporting at least some of the demand in an apparatus via short-range wireless communication.

Short-range wireless interactions may be supported by wireless communication mediums like Bluetooth, WLAN, etc. These transports, while constrained to operation within smaller areas based on limited transmission range, may provide similar data delivery rates to long-range mediums with substantially lower resource requirements. However, short-range wireless mediums are not without some drawbacks. Formal network establishment may be required prior to any data being exchanged between devices. Given the limited transmission range of short-range wireless communication mediums, network links may need to be newly established, or reestablished, on a frequent basis as devices move (e.g., in the instance of mobile handsets or communicators). The resulting delays caused by the repeated requirement for these preliminary negotiations negatively impact the quality of service (QoS) that may be delivered, even in somewhat simple transactions.

SUMMARY

Various example embodiments of the present invention may be directed to a method, apparatus, computer program product and system for facilitating short-range wireless data exchanges between apparatuses that are not linked by a wireless network connection. For example, an apparatus may initially determine if data suitable for transmission without first establishing a formal network connection is pending. For example, in terms of Bluetooth the data may suitable for transmission to another apparatus without having to first negotiate a Bluetooth piconet including both apparatuses. If it determined that data is pending for transmission, the apparatus may scan for apparatus detection packets transmitted from other apparatuses (e.g., enter an inquiry scanning mode). Upon reception of an apparatus detection packet, the apparatus may transmit one or more messages via wireless communication (e.g., execute an extended inquiry response procedure) comprising at least the data.

In addition to the data, the one or more messages transmitted from the apparatus may comprise a destination address for the data. The one or more packets may also include at least one of a source address for the data and information usable in determining whether the data is still valid. In an example implementation using Bluetooth packet structures, the one or more messages may be sent in accordance with an extended inquiry response procedure. The extended inquiry response procedure may comprise the transmission of a Frequency Hop Synchronization (FHS) packet and an extended inquiry response (EIR) packet. The FHS packet may contain an indicator that it is being followed by the EIR packet. The data may be conveyed to another apparatus as a part of the extended inquiry response procedure, which may comprise at least an EIR packet containing the data. In some instances the EIR packet may also include at least one of a destination address, a source address, an identifier and time-to-live information that may be used to determine if the data in the packet is still valid.

If it is determined that the apparatus does not have data pending for transmission then, in accordance with at least one embodiment of the present invention, the apparatus may enter an inquiry mode. In the inquiry mode at least inquiry packet may be transmitted. If an EIR packet is received in response to the inquiry packet, the apparatus may determine whether the EIR packet comprises valid data (e.g., in view of the identifier and time-to-live information) for display on the apparatus or for forwarding to another apparatus. If the data is determined to be valid, the apparatus may proceed to display the data (e.g., display a message included in the EIR packet) to the apparatus user, or may forward the data on to other apparatuses by, for example, entering an inquiry scan mode and transmitting an extended inquiry response as disclosed above.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 1A discloses example apparatuses, systems, configurations, etc. that may be utilized when implementing the various embodiments of the present invention FIG. 1B discloses further detail regarding an example apparatus configuration that may be utilized when implementing the various embodiments of the present invention.

FIG. 4 discloses example frequency hopping synchronization packet and extended inquiry packet structures in accordance with at least one embodiment of the present invention.

FIG. 5 discloses an example of data being exchanged via wireless communication in accordance with at least one embodiment of the present invention.

FIG. 6A discloses a flowchart of an example communication process in accordance with at least one embodiment of the present invention.

DESCRIPTION OF EXAMPLE EMBODIMENTS

Figure 2:
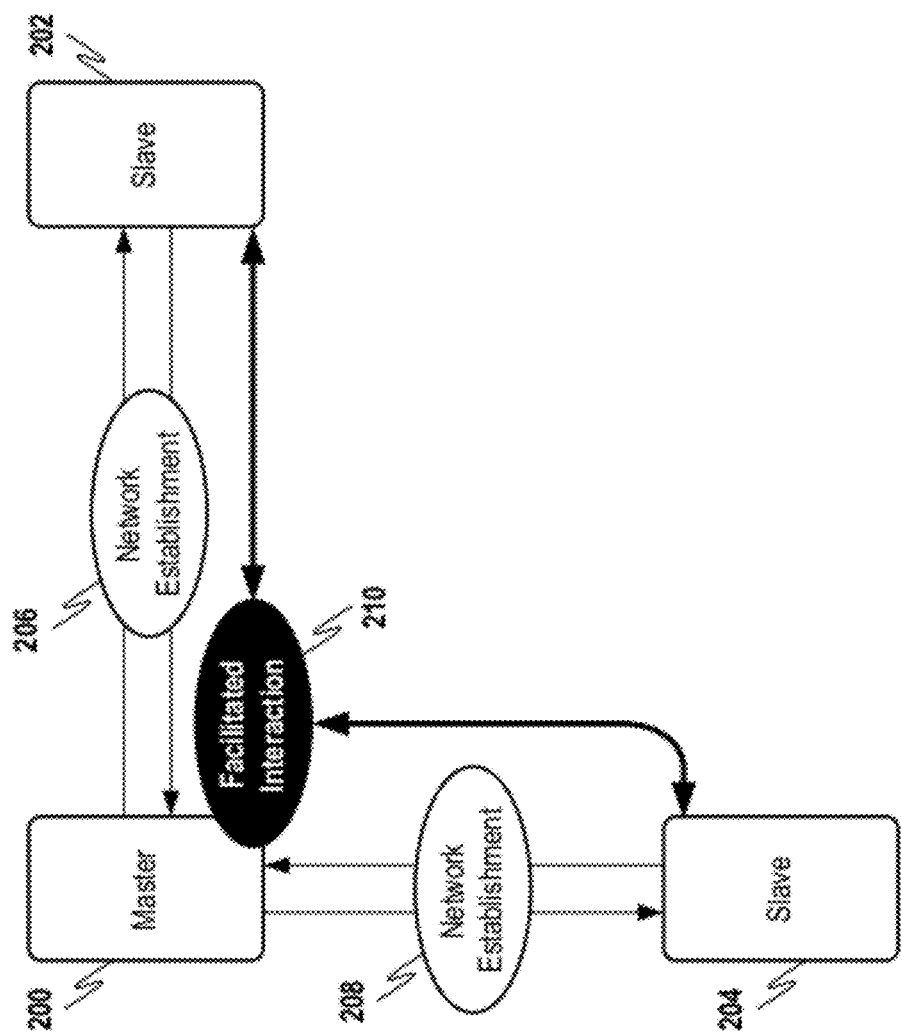
FIG. 2 discloses an example operational scenario in accordance with at least one embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or embedded memories that operate in a static or dynamic mode. Further, memory 104 may include read only memories (ROM), random access memories (RAM), and rewritable memories such as Flash, EPROM, etc. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Example Apparatus Interaction

Wireless data exchanges between apparatuses may be supported via short-range wireless communication. While a multitude of wireless communication mediums are available, the various embodiments of the present invention disclosed herein utilize Bluetooth. The use of Bluetooth in the following disclosure is intended only as an example, and thus, other short-range wireless communication mediums may be employed in implementing the various embodiments.

Bluetooth is an example of a short-range communications technology that was originally intended to replace the cable(s) connecting portable and/or fixed electronic devices, but has grown to facilitate more general wireless communication between various apparatuses. Some of the key features of Bluetooth are robustness, low power consumption and low cost. Many of the features set forth in the Bluetooth core specification are optional, allowing for product differentiation. Existing Bluetooth interaction is based an inquiry method for device discovery, wherein an apparatus inquires about other apparatuses within transmission range and other devices interested in interacting with the inquiring apparatus respond to the inquiry. More specifically, an apparatus performing an inquiry scan is discoverable in that it may respond to inquiry packets that were transmitted from other devices in the inquiry state (e.g., trying to find discoverable devices). The inquiring device and any responding devices may then proceed to form a wireless network (e.g., a Bluetooth piconet) via which apparatus interaction is conducted.

An example wireless network interaction between apparatuses is shown in FIG. 2. Apparatus 200 may serve as master of a network (e.g., Bluetooth piconet) including apparatuses 202 and 204. Only one master 200 exists in any piconet, and this device facilitates all interaction between other network members (e.g., slaves). For example, master 200 may negotiate network membership with apparatus 202, as disclosed at 206, and may do the same with apparatus 204 as shown at 208. Thereafter, apparatus interaction within the piconet is totally synchronized, or facilitated, by master 200 as disclosed at 210. Neither apparatus 202 nor 204 may transmit data within the piconet without first receiving permission from master 200.

In view of these operational requirements it is evident that in short-range wireless mediums like Bluetooth it may be difficult to create systems where multiple devices may share small amounts of data, such as chat messages between users, without having to participate in a more cumbersome synchronized network structure. This is because in traditional synchronized networks one device acts as a master, and the master controls all the data traffic in that all the traffic goes through master. Short-range wireless networks having many members may become bogged down if too much activity occurs at substantially the same time. If the master disappears, the entire network must be reestablished (e.g., with the selection of a new master device). In the example disclosed in FIG. 2, apparatuses 200, 202 and 204 may all be mobile devices each in a different user's possession. The movements of users into and out of transmission range of the piconet may force constant piconet reconfiguration, which may negatively impact the quality of service (QoS) that can be delivered by the participating devices, especially when dealing with a data transaction like chat messaging that is perceived to be simple, and thus, speed is expected.

III. Example Apparatus Interaction

In accordance with at least one embodiment of the present invention, an extended inquiry response procedure may be used to deliver data (e.g., messages) between apparatuses without performing any kind of connection setup procedure. The existing Bluetooth extended inquiry process is disclosed in FIG. 3. Initially an apparatus performing an inquiry (e.g., trying to find other devices) transmits an ID packet. Inquiry messages broadcast by the apparatus do not contain any information about the source, however, they may indicate which class of devices should respond. There is one general inquiry access code (GIAC) to inquire for any device, and multiple dedicated inquiry access codes (DIAC) that only inquire for certain types of devices.

Figure 3:
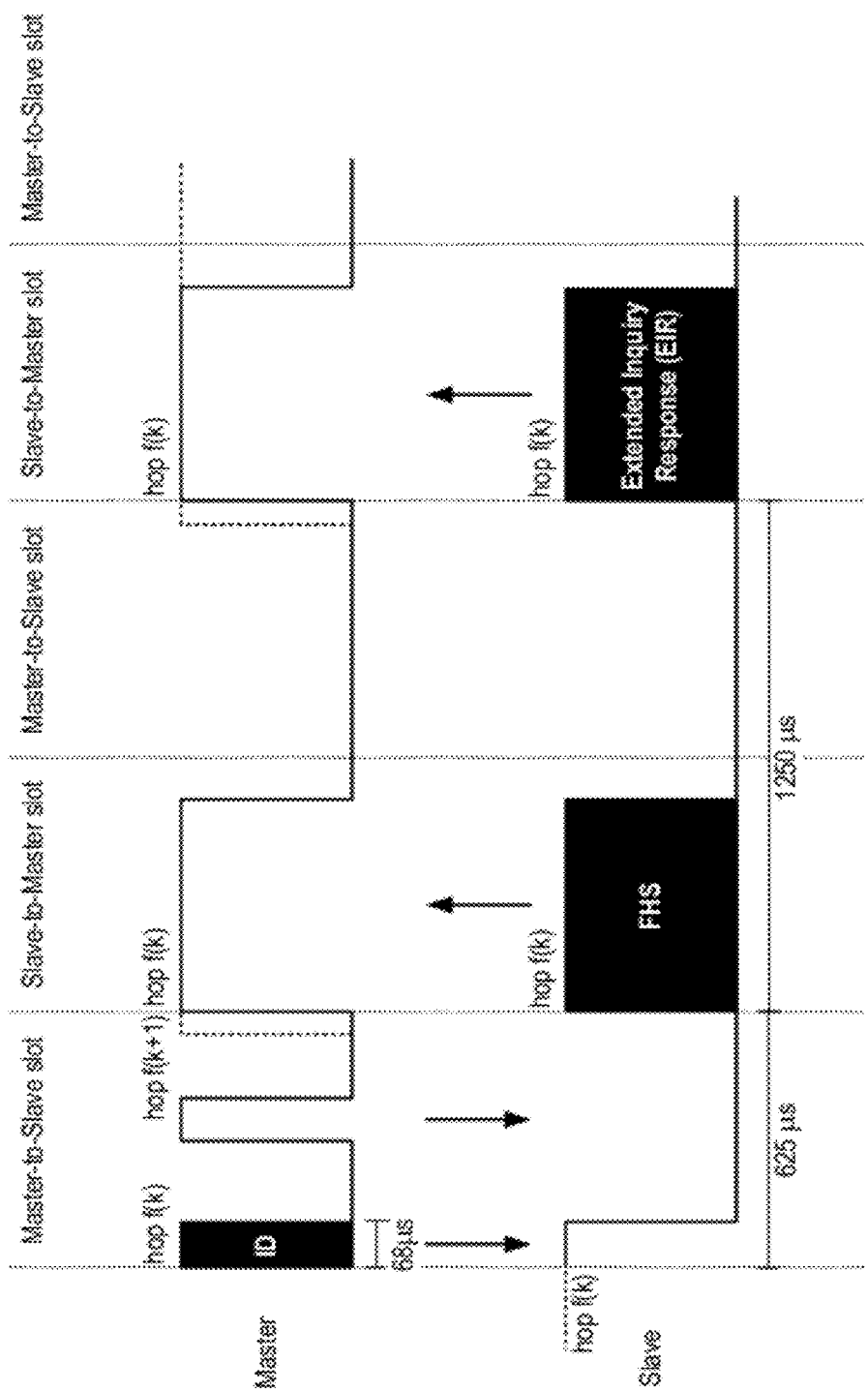
FIG. 3 discloses an example of wireless interaction in accordance with at least one embodiment of the present invention.

The default duration of a Bluetooth inquiry scan is 11.25 ms when performing a standard scan and 22.5 ms when performing an interlaced scan. The default value for an inquiry scan interval is 2.56 s. In the example of FIG. 3, the master-to-slave slot time may be 625 μs, and the total master-to-slave and slave-to-master slot time may be 1250 μs. An inquiry may be performed in order to find discoverable devices within transmission range. Apparatuses in a discoverable mode that receive inquiry packets (e.g., ID packets, typically having a duration of 68 μs) may transmit a response including a Frequency Hop Synchronization (FHS) packet. The FHS packet may comprise at least Bluetooth address, device class, whether an extended inquiry response follows, page scan mode and clock phase. Clock offset and address information may be utilized by inquiring devices to estimate channel information, hop(k), so that communication may be continued on future channels, hop f(k+1), in accordance with a frequency hop pattern. Estimating hop pattern information may allow the inquiring apparatus to follow the hops of the responding apparatus in order to establish a network connection with the responding apparatus.

An extended inquiry response procedure may also be executed by an apparatus in response to the inquiry. An extended inquiry response procedure may include the transmission of an extended inquiry response (EIR) packet that may provide miscellaneous information in addition what is delivered in the basic inquiry response (e.g., FHS packet). EIR packets may typically comprise information regarding, for example, services offered by the apparatus or some vendor specific information. The impending transmission of an EIR packet may be indicated by an EIR indicator bit that is set in the FHS packet. For example, device discovery may be expedited by user-friendly names not being sent in FHS packets, and thus, in order to show a user-friendly name for a found device the name must be provided in a subsequent EIR packet (e.g., unless a mapping between Bluetooth address and the user-friendly name is already stored in the device memory). If it is indicated in an FHS packet that the extended inquiry response packet follows (e.g., the EIR bit is set), it is sent in the next slave-to-master slot. EIR packets are asynchronous connectionless link (ACL) packets of type DM1, DM3, DM5, DH1, DH3 or DH5.

IV. Example Wireless Message Exchanges

In accordance with at least one embodiment of the present invention, an inquiry process may be employed for delivering data (e.g., short messages) between apparatuses that are not already participating in a previously established wireless network. Since apparatuses are not required to operate in a synchronized wireless network, any devices that depart from or enter into transmission range of ongoing interactions may do so without causing any disruption, which may help to provide a better quality of service (QoS) for the users that are exchanging short messages.

In at least one example implementation, EIR packets may be used to convey data (e.g., short messages) by adding messages that are composed on an apparatus to an EIR packet. Received messages originating from other apparatuses but intended for another recipient device may also be attached to EIR packets for retransmission, and thus, the probability of a message arriving at its target destination may be increased. The behavior wherein received messages may be retransmitted if not intended for a receiving device may also help to propagate messages to a larger pool of recipients than the immediate area defined by the radio range of the apparatus.

An example extended inquiry response may comprise an FHS packet and an EIR packet. Examples of FHS and EIR packets, usable in accordance with various embodiments of the present invention, are disclosed in FIG. 4. Continuing with the Bluetooth example, the FHS packet disclosed at 400 may include at least the standard elements of an FHS packet as disclosed in the existing Bluetooth specification. More specifically, FHS packet 400 may comprise at least EIR indicator 302. EIR indicator 302 may be set in order to indicate that EIR packet 402 follows FHS packet 402. EIR packet 402 may include (not in any particular order) header information, data pending for transmission and a destination address, which may be important as a basis for conveying the data to a particular destination device. In addition, EIR packet 402 may optionally include (as indicated in FIG. 4 by a dotted outline) a source address, identification information and time-to-live information. The source address may be optional in EIR packet 400 since in some instances (e.g., Bluetooth) it may be determined from a FHS packet that precedes an EIR packet. Identification information may pertain to, for example, sequence numbering for an EIR packet, while time-to-live information may pertain to the "freshness" of the included data. One or both of identification and time-to-live information may be utilized in determining if the data included in the EIR packet is still valid data. For example, if EIR packet 402 is received by an apparatus out-of-sequence, wherein a preceding packet received by the apparatus is newer than the current packet as indicated by the identification information, then the data in EIR packet 402 may be deemed invalid. Similarly, if EIR packet 402 is received in the apparatus after the time-to-live information in the packet indicates (e.g., via a duration, set time, etc.) that the data is still valid, then the receiving apparatus may deem that the data within EIR packet 402 is invalid.

In accordance with at least one embodiment of the present invention, apparatuses may communicate using short inquiries (e.g., 11.25 ms) at a regular interval (e.g., every second). When an apparatus has data to share, such as a short message, it may write this updated data into an EIR data field that may be sent out as a part of an inquiry response process as a response to a determination that the data to share is suitable for transmission without first establishing a formal communication connection. The device may then enter into an inquiry scan state for a time (e.g., 2 s) that may be longer than the default scanning period (e.g., 11.25 ms). The inquiry scan state time may be predefined or may vary depending on, for example, other communication needs in the device. However, it is beneficial for the device to remain in an inquiry scan state for a time period of at least one standard scanning period (e.g., 11.25 ms) to ensure that, for example, ID packets transmitted by other devices in an inquiry state are detected, and the data to be shared can be transmitted to these inquiring devices within the extended inquiry response procedure.

An example interaction by which data may be exchanged between apparatuses via wireless communication, but without the requirement of a preexisting network relationship, is disclosed in FIG. 5 Devices A, B and C may operate using the same wireless communication medium (e.g., Bluetooth) and may be within transmission range of each other. The example of FIG. 5 may initiate where devices A, B and C perform inquiries at regular interval as shown at 500. A message including data suitable for transmission without first establishing a formal communication connection may then be determined to be pending for transmission in device C prior to the next inquiry window at 502, and thus, device C may be triggered to initiate inquiry scanning. The inquiry scanning "window" may be a predefined time period (e.g., 2 s) that is set to be longer than the default scanning period (e.g., 11.25 ms or 22.5 ms). When devices A and B transmit regular inquiries, as shown at 504, the inquiries may be received by device C, which then executes an extended response procedure (e.g., including transmission of an FHS packet and EIR packet), which may be received by each of devices A and B. When devices A and B transmit regular inquiries, as shown at 504, the inquiries may be received by device C, which may then execute an extended response procedure (e.g., including transmission of an FHS packet and EIR packet), which may be received by each of devices A and B. After receiving the EIR packets from device C, devices A and B may decide what to do with the data in the EIR packets (display for a user, retransmit, discard as invalid, etc.). The timing in FIG. 5 (e.g., a 1 s interval and an extended response duration of 22.5 ms) are only for example. Devices may perform standard inquiry scans also when no messages are to be sent so that new devices may learn about message groups and discover devices for other purposes.

In an alternative implementation, apparatuses that participate in communication may operate in a continuous inquiry state when they do not have anything to share in order to expedite the reception of incoming EIR messages, and hence, increase messaging performance. When a device has something to share (e.g., a short message), it may add the short message to an EIR packet, and if not otherwise performing inquiry scanning, inquiry scanning (e.g., in order to transmit an outgoing short message) may then be enabled for a predefined time. While this configuration may increase performance, continuous scanning may increase message traffic in the immediate area, and may further place higher burdens on processing and power resources in an apparatus in order to maintain continuous scanning.

By implementing messaging systems, in accordance with at least one embodiment of the present invention, "chat" groups may be formed between multiple apparatuses without the need to first establish networked relationships. Apparatuses may simply create extended inquiry responses that include dedicated chat information such as a chat group identification (ID), etc. When users desire to check if any chat groups available, they may just perform inquiries and collect chat group ID information from apparatuses within transmission range. If a user would like to join to certain chat group, all information (e.g., short messages transmitted in extended inquiry responses) may be transmitted including an ID corresponding to the certain chat group. There may also be multiple chat groups that are active at the same time and in the same place, and thus, filtering may be done by the application utilizing the data provided in the EIR packets.

A flowchart of an example process, in accordance with at least one embodiment of the present invention, is disclosed in FIG. 6A. The process may initiate in step 600. In step 602 a determination may be made as to whether data is pending in an apparatus for transmission, wherein the pending data may be transmitted without first establishing a formal communication connection. For example, an apparatus may not currently be interacting with other apparatuses, but may determine that data, such as a chat message for another user, is ready to transmit. In accordance with at least one embodiment of the present invention, this type of data may be sent to other apparatuses without the apparatus having to first establish a network (e.g., a short-range wireless network) including the other apparatuses. If in step 602 it is determined that no data is pending for transmission, then the process may terminate in step 604 and may reinitiate in step 600.

Alternatively, if in step 602 it is determined that data is pending for transmission, then in step 606 the apparatus may scan for apparatus detection packets that were transmitted by other devices. Apparatus detection packets may be invitations to communicate sent by other apparatuses, and thus, may traditionally serve as a pretense to form a formal communication connection. However, in accordance with at least one example implementation of the present invention, the apparatus may utilize the receipt of an apparatus detection packet to indicate that another apparatus within transmission range is in a receptive mode (e.g., may be able to receive and process responses to the apparatus detection packet). If in step 608 an apparatus detection packet is not received in the apparatus, then the process may be complete in step 604 and may reinitiate in step 600. Otherwise, the reception of apparatus detection packets in step 608 may trigger the transmission of one or more messages comprising at least the data pending for transmission. The process may then terminate in step 604 and may reinitiate in step 600.

Figure 6B:
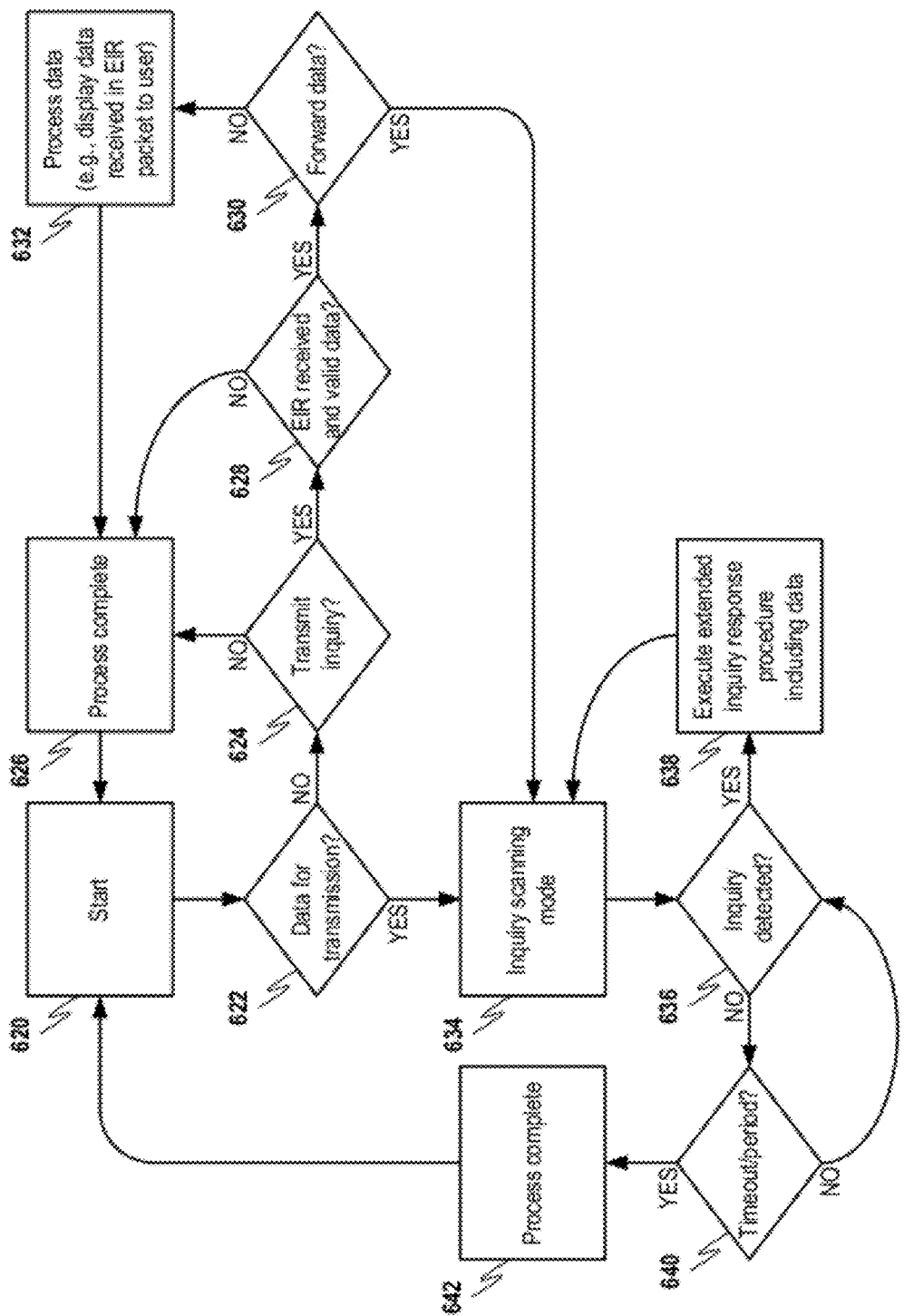
FIG. 6B discloses a flowchart of an example communication process based on Bluetooth communication in accordance with at least one embodiment of the present invention.

A flowchart of an alternative example communication process based on packet formats typically used in Bluetooth communication is disclosed in FIG. 6B. The process may initiate in step 620. In step 622 a determination may then be made as to whether an apparatus has data pending for transmission. The pending data may be, for example, a short message for transmission to another apparatus. If in step 622 it is determined that no data is pending for transmission, the process may proceed to step 624 where a determination may be made whether to transmit an inquiry packet (e.g. enter an inquiry mode). The determination in step 624 as to whether to perform an inquiry may be based on whether the apparatus is configured to operate in a periodic inquiry mode, which may be more resource and traffic conscious, or a continuous inquiry mode that may improve response time. If it is determined in step 624 that an inquiry should not be performed, then in step 626 the process may be complete and the process may then reinitiate in step 620.

If in step 624 it is determined that the apparatus should perform an inquiry, then the inquiry may be performed (e.g., ID packet may be transmitted), and a further determination may be made in step 628 as to whether an EIR packet has been received including valid data. EIR packets may be preceded by FHS packets having their EIR indicator set to indicate that an EIR packet follows. If an EIR packet is received by the apparatus, the validity of data included in the EIR packet may be evaluated based on other information included the EIR packet, such as identifier information or time-to-live information. If no EIR packet is received by the apparatus, or if an EIR packet is received by the apparatus including data that is determined to be invalid, the process may again terminate in step 626. Otherwise the process may proceed to step 630 where a further determination may be made as to whether to forward the data contained in the EIR packet. This determination may be made based on, for example, a destination address also included in the EIR packet. If the destination address corresponds to the receiving device, then the apparatus may process the packet in step 632 (e.g., may display the data included in the EIR packet to the user). The process may then terminate in step in 626 and reinitiate in step 620.

If in step 622 a determination is made that data is pending for transmission in the apparatus, or alternatively, if in step 630 the data in the received EIR packet is determined to be intended for another apparatus, the process may proceed to step 634 wherein the apparatus may enter an inquiry scanning mode. In this mode the apparatus may scan for inquiries transmitted from other apparatuses within transmission range. If in step 636 an inquiry is detected (e.g., an ID packet from another apparatus is received in the apparatus), the process may proceed to step 638 where an extended inquiry response procedure may be executed. The extended inquiry response procedure may comprise transmitting an FHS packet having its EIR indicator set to indicate that an EIR packet follows, followed by transmitting an EIR packet including the data for transmission, either from the apparatus or previously received data to be forwarded per step 630. The process may then return to step 634 to continue the inquiry scanning mode. Scanning and/or extended inquiry response transmission may continue in steps 636 and 638 until a timeout is determined to have occurred or a period for inquiry scanning is determined to have concluded in step 640. The process may then terminate in step 642 and may reinitiate in step 620.

The various embodiments of the present invention are not limited only to the examples disclosed above, and may encompass other configurations or implementations.

For example, embodiments of the present invention may encompass an apparatus comprising means for determining if data suitable for transmission without first establishing a formal communication connection is pending for transmission, and means for, if the data is determined to be pending, entering a scanning mode for receiving apparatus detection packets transmitted from other apparatuses and wherein, if an apparatus detection packet is detected, transmitting one or more messages comprising at least the data via wireless communication.

At least one other example embodiment of the present invention may encompass an apparatus comprising means for determining if data is pending for wireless transmission from an apparatus, and means for, if data is determined to be pending for wireless transmission, entering an inquiry scanning mode wherein, if an inquiry packet is detected by the apparatus, executing an extended inquiry response procedure comprising at least the data.

At least one other example embodiment of the present invention may encompass an apparatus comprising means for entering an inquiry mode wherein at least one inquiry packet is transmitted, and means for if an extended response packet is received in response to the at least one inquiry packet, determining if the extended response packet includes valid data for display on the apparatus or for forwarding to another apparatus, wherein determining if the extended response packet includes valid data comprises evaluating information set in at least one of an identification field or a time-to-live field included in the extended response packet.

At least one other example embodiment of the present invention may include electronic signals that cause an apparatus to determine if data suitable for transmission without first establishing a formal communication connection is pending for transmission, and if the data is determined to be pending, entering a scanning mode for receiving apparatus detection packets transmitted from other apparatuses and wherein, if an apparatus detection packet is detected, transmitting one or more messages comprising at least the data via wireless communication.

At least one other example embodiment of the present invention may include electronic signals that cause an apparatus to determine if data is pending for wireless transmission, and if data is determined to be pending for wireless transmission, enter an inquiry scanning mode wherein, if an inquiry packet is detected by the apparatus, executing an extended inquiry response procedure comprising at least the data.

At least one other example embodiment of the present invention may include electronic signals that cause an apparatus to enter an inquiry mode wherein at least one inquiry packet is transmitted, and if an extended response packet is received in response to the at least one inquiry packet, determine if the extended response packet includes valid data for display on the apparatus or for forwarding to another apparatus, wherein determining if the extended response packet includes valid data comprises evaluating information set in at least one of an identification field or a time-to-live field included in the extended response packet.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
   determining if data suitable for transmission without first establishing a formal communication connection is pending for transmission in an apparatus; and
   if the data is determined to be pending, entering a scanning mode in the apparatus for receiving apparatus detection packets transmitted from other apparatuses and wherein, if an apparatus detection packet is detected from any other device within transmission range, transmitting from the apparatus one or more messages comprising at least the data via wireless communication.

2. The method of claim 1, wherein the one or more messages further comprise a destination address for the data.

3. The method of claim 1, wherein the one or more messages further comprise at least one of a source address for the data and information usable in determining whether the data is still valid.

4. The method of claim 1, wherein the apparatus remains in the scanning mode for a period of time that is longer than a time period set in the apparatus for receiving apparatus detection packets when it is determined that there is no pending data suitable for transmission without the establishment of a formal communication connection.

5. A method, comprising:
   determining if data is pending for wireless transmission from an apparatus; and
   if data is determined to be pending for wireless transmission, entering an inquiry scanning mode wherein, if an inquiry packet is detected by the apparatus from any other device within transmission range, executing an extended inquiry response procedure comprising at least the data.

6. The method of claim 5, wherein the extended inquiry response procedure comprises transmitting two packets including a frequency hopping synchronization (FHS) packet comprising an extended inquiry response (EIR) indicator and an EIR packet comprising at least the data and a destination address for the data.

7. The method of claim 5, wherein the apparatus remains in the inquiry scanning mode for a period of time that is longer than a predetermined inquiry scanning interval.

8. A computer program product comprising computer executable program code recorded on a non-transitory computer readable storage medium, the computer executable program code comprising:
   code configured to cause an apparatus to determine if data suitable for transmission without first establishing a formal communication connection is pending for transmission; and
   code configured to cause an apparatus to, if the data is determined to be pending, enter a scanning mode for receiving apparatus detection packets transmitted from other apparatuses and wherein, if an apparatus detection packet is detected from any other device within transmission range, transmitting one or more messages comprising at least the data via wireless communication.

9. The computer program product of claim 8, further comprising code configured to cause the apparatus to remain in the scanning mode for a period of time that is longer than a time period set in the apparatus for receiving apparatus detection packets when it is determined that there is no pending data suitable for transmission without the establishment of a formal communication connection.

10. A computer program product comprising computer executable program code recorded on a non-transitory computer readable storage medium, the computer executable program code comprising:
    code configured to cause an apparatus to determine if data is pending for wireless transmission; and
    code configured to cause the apparatus to, if data is determined to be pending for wireless transmission, enter an inquiry scanning mode wherein, if an inquiry packet is detected from any other device within transmission range, executing an extended inquiry response procedure comprising at least the data.

11. The computer program product of claim 10, wherein the code configured to cause the apparatus to execute the extended inquiry response procedure comprises code configured to cause the apparatus to transmit two packets including a frequency hopping synchronization (FHS) packet comprising an extended inquiry response (EIR) indicator and an EIR packet comprising at least the data and a destination address for the data.

12. The computer program product of claim 10, further comprising code configured to cause the apparatus to remain in the inquiry scanning mode for a period of time that is longer than a predetermined inquiry scanning interval.

13. An apparatus, comprising:
    at least one processor; and
    at least one memory including executable instructions, the at least one memory and the executable instructions being configured to, in cooperation with the at least one processor, cause the apparatus to perform at least the following:

determine if data suitable for transmission without first establishing a formal communication connection is pending for transmission; and if the data is determined to be pending, enter a scanning mode for receiving apparatus detection packets transmitted from other apparatuses and wherein, if an apparatus detection packet is detected from any other device within transmission range, transmit one or more messages comprising at least the data via wireless communication.

14. The apparatus of claim 13, wherein the one or more messages further comprise a destination address for the data.

15. The apparatus of claim 13, wherein the one or more messages further comprise at least one of a source address for the data and information usable in determining whether the data is still valid.

16. The apparatus of claim 13, further comprising the at least one memory and the executable instructions being configured to, in cooperation with the at least one processor, cause the apparatus to remain in the scanning mode for a period of time that is longer than a time period set in the apparatus for receiving apparatus detection packets when it is determined that there is no pending data suitable for transmission without the establishment of a formal communication connection.

17. An apparatus, comprising:
at least one processor; and
at least one memory including executable instructions, the at least one memory and the executable instructions being configured to, in cooperation with the at least one processor, cause the apparatus to perform at least the following:

determine if data is pending for wireless transmission; and if data is determined to be pending for wireless transmission, enter an inquiry scanning mode wherein, if an inquiry packet is detected from any other device within transmission range, executing an extended inquiry response procedure comprising at least the data.

18. The apparatus of claim 17, wherein the at least one memory and the executable instructions being configured to, in cooperation with the at least one processor, cause the apparatus to execute an extended inquiry response procedure comprises the at least one memory and the executable instructions being configured to, in cooperation with the at least one processor, cause the apparatus to transmit two packets including a frequency hopping synchronization (FHS) packet comprising an extended inquiry response (EIR) indicator and an EIR packet comprising at least the data and a destination address for the data.

19. The apparatus of claim 17, further comprising the at least one memory and the executable instructions being configured to, in cooperation with the at least one processor, cause the apparatus to remain in the inquiry scanning mode for a period of time that is longer than a predetermined inquiry scanning interval.

* * * * *